(12) United States Patent
Long

(10) Patent No.: US 10,412,577 B2
(45) Date of Patent: Sep. 10, 2019

(54) METHOD FOR MIGRATION FROM SIM CARD TO EUICC, DEVICE, AND SYSTEM

(71) Applicant: Huawei Technologies Co., Ltd., Shenzhen (CN)

(72) Inventor: Shuiping Long, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/759,090

(22) PCT Filed: Sep. 11, 2015

(86) PCT No.: PCT/CN2015/089451
§ 371 (c)(1),
(2) Date: Mar. 9, 2018

(87) PCT Pub. No.: WO2017/041299
PCT Pub. Date: Mar. 16, 2017

(65) Prior Publication Data
US 2019/0053040 A1 Feb. 14, 2019

(51) Int. Cl.
*H04W 8/20* (2009.01)
*H04W 8/18* (2009.01)
*H04L 29/06* (2006.01)
*H04W 12/06* (2009.01)

(52) U.S. Cl.
CPC ......... *H04W 8/205* (2013.01); *H04L 63/0876* (2013.01); *H04W 8/18* (2013.01); *H04W 8/183* (2013.01); *H04W 12/06* (2013.01)

(58) Field of Classification Search
CPC ....... H04W 8/205; H04W 8/18; H04W 8/183; H04W 12/06; H04L 63/0876
See application file for complete search history.

(56) References Cited

U.S. PATENT DOCUMENTS 9,264,844 B2 * 2/2016 Park .................. H04W 8/205
2013/0023309 A1 1/2013 Holtmanns et al.
(Continued)

FOREIGN PATENT DOCUMENTS

CN 103533634 A 1/2014
CN 103747104 A 4/2014
(Continued)

OTHER PUBLICATIONS

CSMG, "Reprogrammable SIMs: Technology, Evolution and Implications," XP002716258, Final Report, dated Sep. 25, 2012, 95 pages.
Foreign Communication From a Counterpart Application, European Application No. 15903405.7, Extended European Search Report dated Jul. 25, 2018, 12 pages.
(Continued)

*Primary Examiner* — Duc C Ho
(74) *Attorney, Agent, or Firm* — Conley Rose, P.C.

(57) ABSTRACT

A method for migration from a subscriber identity module (SIM) card to an embedded universal integrated circuit card (eUICC), a device, and a system, where the method includes receiving a first migration instruction from a user, where the first migration instruction instructs to migrate from a SIM card to an eUICC, sending a first request to a server, where the first request includes a user identity corresponding to the SIM card and an identity of the eUICC such that the server generates or selects a profile for the eUICC according to the user identity, downloading the profile from the server to the eUICC, enabling the profile, accessing a mobile network using the profile, and disconnecting a session from the SIM card. The solution resolves a requirement that a user of a compatible terminal needs to implement migration from a SIM card to an eUICC during a transition period.

20 Claims, 9 Drawing Sheets

(56) References Cited

U.S. PATENT DOCUMENTS

| | | | |
|---|---|---|---|
| 2014/0031012 A1* | 1/2014 | Park | H04W 12/06 |
| | | | 455/411 |
| 2014/0045460 A1 | 2/2014 | Park et al. | |
| 2016/0020803 A1* | 1/2016 | Cha | H04W 76/10 |
| | | | 455/558 |
| 2016/0283216 A1 | 9/2016 | Gao | |

FOREIGN PATENT DOCUMENTS

| | | |
|---|---|---|
| CN | 104703170 A | 6/2015 |
| WO | 2012058099 A1 | 5/2012 |

OTHER PUBLICATIONS

Machine Translation and Abstract of Chinese Publication No. CN103533634, Jan. 22, 2014, 18 pages.

Machine Translation and Abstract of Chinese Publication No. CN103747104, Apr. 23, 2014, 19 pages.

"3rd Generation Partnership Project; Technical Specification Group Core Network and Terminals; Characteristics of the Universal Subscriber Identity Module (USIM) application (Release 12)," 3GPP TS 31.102 V12.8.1, Jul. 2015, 259 pages.

Foreign Communication From a Counterpart Application, PCT Application No. PCT/CN2015/089451, English Translation of International Search Report dated May 30, 2016, 2 pages.

Foreign Communication From a Counterpart Application, PCT Application No. PCT/CN2015/089451, English Translation of Written Opinion dated May 30, 2016, 6 pages.

\* cited by examiner

METHOD FOR MIGRATION FROM SIM CARD TO EUICC, DEVICE, AND SYSTEM

CROSS-REFERENCE TO RELATED APPLICATION

This application is a U.S. National Stage of International Patent Application No. PCT/CN2015/089451 filed on Sep. 11, 2015, which is hereby incorporated by reference in its entirety.

TECHNICAL FIELD

The present disclosure relates to the field of communications technologies, and in particular, to a method for migration from a subscriber identity module (SIM) card to an embedded universal integrated circuit card (eUICC), a device, and a system.

BACKGROUND

With continuous development of an Internet of Things technology, and particularly, the increasing expansion of Internet of Things terminal products to effectively activate an Internet of Things terminal connection and change a home network operator, an eUICC is developed. The eUICC may be purchased by any one of a communications module vendor, a terminal vendor, an operator, or a machine to machine (M2M) industry customer from a card manufacturer, and finally embedded into an M2M terminal. The use of the eUICC is not limited to the M2M field. The eUICC may also be used in a consumer terminal such as a mobile phone, a tablet, or a wearable device. The eUICC is not necessarily an embedded card, and may be a conventional SIM card.

The operator may first apply the eUICC to the M2M field. Then, the operator will gradually apply the eUICC to a wearable device, a tablet computer, and a smartphone. In brief, there is a relatively long transition period before the extensive application of the eUICC.

During the transition period, a user has a requirement for migration from a SIM card to an eUICC. For example, a user having a SIM card purchases a compatible terminal (embedded with an eUICC and having at least one SIM card slot or card tray), and the user expects to migrate a function of the SIM card to the eUICC such that the SIM card is discarded or put aside. The compatible terminal may be able to identify and use the eUICC of a SIM card form. The SIM card is mainly used for security authentication when a terminal accesses a mobile network, and may also support some value-added services (for example, a mobile wallet). In this specification, a SIM card, a universal integrated circuit card (UICC), a universal SIM (USIM) card, a code division multiple access (CDMA) subscriber identity module (CSIM) card, a Removable User Identity Module (RUIM) card, and a User Identity Module (UIM) card are collectively referred to as the SIM card.

SUMMARY

Embodiments of the present disclosure provide a method for migration from a SIM card to an eUICC, a device, and a system in order to resolve a requirement that a user of a compatible terminal needs to implement migration from a SIM card to an eUICC during a transition period.

According to a first aspect, a method for migration from a SIM card to an eUICC at a terminal side is provided, including receiving a first migration instruction entered by a user, where the first migration instruction is used to instruct to migrate from a SIM card to an eUICC, sending a first request to a server in response to the first migration instruction, where the first request includes a user identity corresponding to the SIM card and an identity of the eUICC such that the server generates or selects a profile for the eUICC according to the user identity, downloading the profile from the server to the eUICC, enabling the profile, accessing a mobile network using the profile, and disconnecting a session from the SIM card.

With reference to the first aspect, in a first possible implementation, before disconnecting a session from the SIM card, the method further includes receiving a first international mobile subscriber identity (IMSI) change instruction sent by the server to overwrite an existing IMSI of the SIM card with an invalid IMSI.

With reference to the first aspect, in a second possible implementation, the first request further includes first verification information.

With reference to the second possible implementation of the first aspect, in a third possible implementation, before sending a first request to a server, the method further includes sending a second request to the server, where the second request includes the user identity corresponding to the SIM card such that the server sends the first verification information to the terminal or the SIM card using the user identity corresponding to the SIM card.

With reference to the first aspect, in a fourth possible implementation, after disconnecting a session from the SIM card, the method further includes receiving a second migration instruction entered by the user, where the second migration instruction is used to instruct to migrate from the eUICC to the SIM card, sending a third request to the server in response to the second migration instruction, where the third request includes a user identity corresponding to the profile, an identifier of the profile, and the identity of the eUICC, receiving a disabling instruction or a deletion instruction sent by the server, where the disabling instruction or the deletion instruction includes the identity of the eUICC and the identifier of the profile, and disabling the profile in response to the disabling instruction, or deleting the profile in response to the deletion instruction.

With reference to the fourth possible implementation of the first aspect, in a fifth possible implementation, before receiving a disabling instruction or a deletion instruction sent by the server, the method further includes receiving a second IMSI change instruction sent by the server to write a valid IMSI into the SIM card.

With reference to the fourth possible implementation of the first aspect, in a sixth possible implementation, the third request further includes second verification information.

With reference to the six possible implementation of the first aspect, in a seventh possible implementation, before sending a third request to the server, the method further includes sending a fourth request, where the fourth request includes the user identity corresponding to the profile such that the server sends the second verification information to the terminal or the eUICC using the user identity corresponding to the profile.

According to a second aspect, a method for migration from a SIM card to an eUICC on a server side is provided, including receiving a first request sent by a terminal, where the first request includes a user identity corresponding to a SIM card in the terminal and an identity of an eUICC in the terminal, and in response to the first request, generating or selecting a profile for the eUICC according to the user identity corresponding to the SIM card, and downloading the profile to the eUICC.

With reference to the second aspect, in a first possible implementation, after generating or selecting a profile for the eUICC according to the user identity corresponding to the SIM card, and downloading the profile to the eUICC, the method further includes writing a new root key into subscription data corresponding to the user identity, and disabling an old root key, where the old root key is the same as a root key in the SIM card, and/or sending a first IMSI change instruction to the terminal, where the first IMSI change instruction includes an invalid IMSI such that an existing IMSI of the SIM card is overwritten by the invalid IMSI.

With reference to the second aspect, in a second possible implementation, the first request further includes first verification information.

With reference to the second possible implementation of the second aspect, in a third possible implementation, before receiving a first request sent by a terminal, the method further includes receiving a second request sent by the terminal, where the second request includes the user identity corresponding to the SIM card, and sending the first verification information to the terminal or the SIM card in response to the second request.

With reference to the second aspect, in a fourth possible implementation, after generating or selecting a profile for the eUICC according to the user identity corresponding to the SIM card, and downloading the profile to the eUICC, the method further includes receiving a third request sent by the terminal, where the third request includes a user identity corresponding to the profile, an identifier of the profile, and the identity of the eUICC, and sending a disabling instruction or a deletion instruction to the terminal in response to the third request to disable or delete the profile, where the disabling instruction or the deletion instruction includes the identity of the eUICC and the identifier of the profile.

With reference to the fourth possible implementation of the second aspect, in a fifth possible implementation, before sending a disabling instruction or a deletion instruction to the terminal, the method further includes sending a second IMSI change instruction to the terminal, where the second IMSI change instruction includes a valid IMSI such that the valid IMSI is written into the SIM card, and after sending a disabling instruction or a deletion instruction to the terminal, the method further includes enabling an old root key in subscription data corresponding to the user identity, where the old root key is the same as a root key in the SIM card.

With reference to the fourth possible implementation of the second aspect, in a sixth possible implementation, the third request further includes second verification information.

With reference to the sixth possible implementation of the second aspect, in a seventh possible implementation, before receiving a third request sent by the terminal, the method further includes receiving a fourth request sent by the terminal, where the fourth request includes the user identity corresponding to the profile, and in response to the fourth request, sending the second verification information to the terminal or the eUICC according to the user identity.

According to a third aspect, a terminal is provided, including a first receiving unit configured to receive a first migration instruction entered by a user, where the first migration instruction is used to instruct to migrate from a SIM card to an eUICC, a first sending unit configured to send a first request to a server in response to the first migration instruction, where the first request includes a user identity corresponding to the SIM card and an identity of the eUICC such that the server generates or selects a profile for the eUICC according to the user identity, a downloading unit configured to download the profile from the server to the eUICC, an enabling unit configured to enable the profile, a connection unit configured to access a mobile network using the profile, and a session disconnection unit configured to disconnect a session from the SIM card.

With reference to the third aspect, in a first possible implementation, the terminal further includes a third receiving unit configured to receive a first IMSI change instruction sent by the server to overwrite an existing IMSI of the SIM card with an invalid IMSI before the session disconnection unit disconnects the session from the SIM card.

With reference to the third aspect, in a second possible implementation, the first request further includes first verification information.

With reference to the second possible implementation of the third aspect, in a third possible implementation, the terminal further includes a second sending unit configured to send a second request to the server before the first sending unit sends the first request to the server, where the second request includes the user identity corresponding to the SIM card such that the server sends the first verification information to the terminal or the SIM card using the user identity corresponding to the SIM card.

With reference to the third aspect, in a fourth possible implementation, the first receiving unit is further configured to receive a second migration instruction entered by the user after the session disconnection unit disconnects the session from the SIM card, where the second migration instruction is used to instruct to migrate from the eUICC to the SIM card, the first sending unit is further configured to send a third request to the server in response to the second migration instruction, where the third request includes a user identity corresponding to the profile, an identifier of the profile, and the identity of the eUICC, and the terminal further includes a second receiving unit, a disabling unit, or a deletion unit, where the second receiving unit is configured to receive a disabling instruction or a deletion instruction sent by the server, where the disabling instruction or the deletion instruction includes the identity of the eUICC and the identifier of the profile, the disabling unit is configured to disable the profile in response to the disabling instruction, and the deletion unit is configured to delete the profile in response to the deletion instruction.

With reference to the fourth possible implementation of the third aspect, in a fifth possible implementation, the terminal further includes a fourth receiving unit configured to receive a second IMSI change instruction sent by the server to write a valid IMSI into the SIM card before the second receiving unit receives the disabling instruction or the deletion instruction sent by the server.

With reference to the fourth possible implementation of the third aspect, in a sixth possible implementation, the third request further includes second verification information.

With reference to the sixth possible implementation of the third aspect, in a seventh possible implementation, the terminal further includes a third sending unit configured to send a fourth request before the first sending unit sends the third request to the server, where the fourth request includes the user identity corresponding to the profile such that the server sends the second verification information to the terminal or the eUICC using the user identity corresponding to the profile.

According to a fourth aspect, a server is provided, including a first receiving unit configured to receive a first request sent by a terminal, where the first request includes a user identity corresponding to a SIM card in the terminal and an identity of an eUICC in the terminal, a generation unit configured to in response to the first request, generate or select a profile for the eUICC according to the user identity corresponding to the SIM card, and a downloading unit configured to download the profile to the eUICC.

With reference to the fourth aspect, in a first possible implementation, the server further includes a first root key processing unit and/or a first sending unit, and after the generation unit generates or selects the profile for the eUICC according to the user identity corresponding to the SIM card and the downloading unit downloads the profile to the eUICC, the first root key processing unit is configured to write a new root key into subscription data corresponding to the user identity, and disable an old root key, where the old root key is the same as a root key in the SIM card, and the first sending unit is configured to send a first IMSI change instruction to the terminal, where the first IMSI change instruction includes an invalid IMSI such that an existing IMSI of the SIM card is overwritten by the invalid IMSI.

With reference to the fourth aspect, in a second possible implementation, the first request further includes first verification information.

With reference to the second possible implementation of the fourth aspect, in a third possible implementation, the server further includes a second receiving unit and a second sending unit, and before the first receiving unit receives the first request sent by the terminal, the second receiving unit is configured to receive a second request sent by the terminal, where the second request includes the user identity corresponding to the SIM card, and the second sending unit is configured to send the first verification information to the terminal or the SIM card in response to the second request.

With reference to the fourth aspect, in a fourth possible implementation, after the generation unit generates or selects the profile for the eUICC according to the user identity corresponding to the SIM card and the downloading unit downloads the profile to the eUICC, the first receiving unit is further configured to receive a third request sent by the terminal, where the third request includes a user identity corresponding to the profile, an identifier of the profile, and the identity of the eUICC, and the server further includes a disabling unit or a deletion unit, where the disabling unit is configured to send a disabling instruction to the terminal in response to the third request, to disable the profile, where the disabling instruction includes the identity of the eUICC and the identifier of the profile, and the deletion unit is configured to send a deletion instruction to the terminal in response to the third request to delete the profile, where the deletion instruction includes the identity of the eUICC and the identifier of the profile.

With reference to the fourth possible implementation of the fourth aspect, in a fifth possible implementation, the server further includes a third sending unit and a second root key processing unit, and before the disabling unit sends the disabling instruction or the deletion unit sends the deletion instruction to the terminal, the third sending unit is configured to send a second IMSI change instruction to the terminal, where the second IMSI change instruction includes a valid IMSI such that the valid IMSI is written into the SIM card, and after the disabling unit sends the disabling instruction or the deletion unit sends the deletion instruction to the terminal, the second root key processing unit is configured to enable an old root key in subscription data corresponding to the user identity, where the old root key is the same as a root key in the SIM card.

With reference to the fourth possible implementation of the fourth aspect, in a sixth possible implementation, the third request further includes second verification information.

With reference to the sixth possible implementation of the fourth aspect, in a seventh possible implementation, the server further includes a third receiving unit and a fourth sending unit, and before the first receiving unit receives the third request sent by the terminal, the third receiving unit is configured to receive a fourth request sent by the terminal, where the fourth request includes the user identity corresponding to the profile, and the fourth sending unit is configured to, in response to the fourth request, send the second verification information to the terminal or the eUICC according to the user identity.

According to a fifth aspect, a communications system is provided, including a terminal and a server, where the terminal is the terminal described in content of the third aspect, and details are not further described herein, and the server is the server described in content of the fourth aspect, and details are not further described herein.

In the embodiments of the present disclosure, a server is requested to generate a profile according to a user identity corresponding to a SIM card, and to download the profile to an eUICC, after the profile is enabled successfully, a mobile network is accessed using the profile, and a session between a terminal and the SIM card is disconnected. This resolves a requirement that a user of a compatible terminal needs to implement migration from a SIM card to an eUICC during a transition period.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
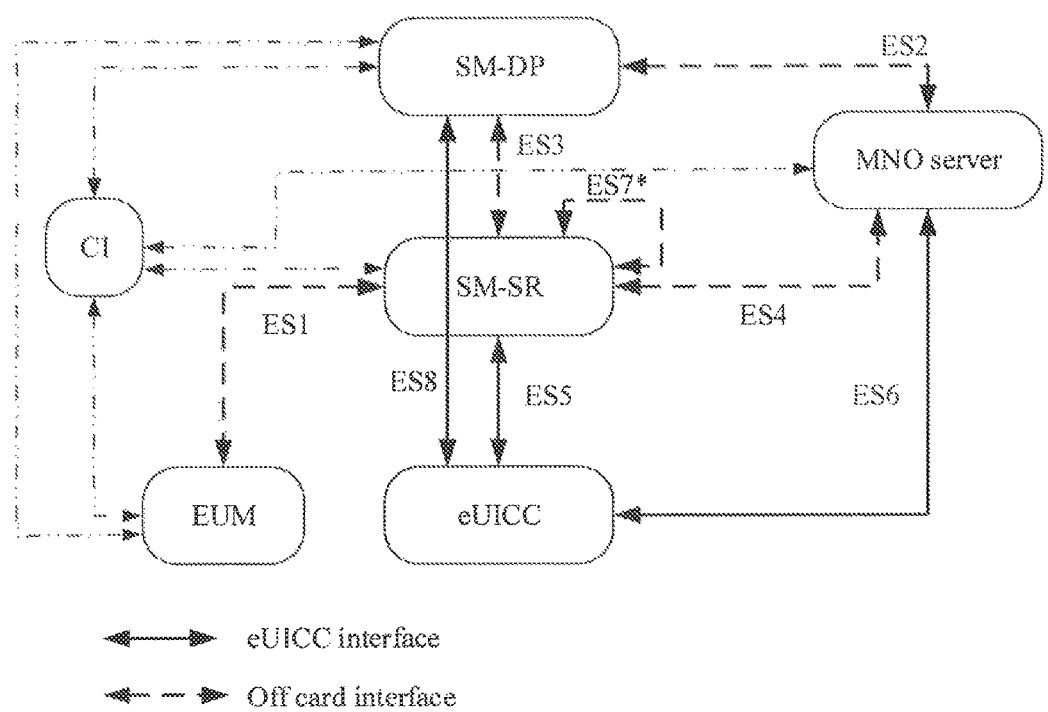
FIG. 1 is a schematic diagram of a remote provisioning system of an eUICC in the embodiments of the present disclosure.

For better understanding of the embodiments of the present disclosure, the following briefly describes a remote provisioning system of an eUICC with reference to FIG. 1. As shown in FIG. 1, the system for implementing remote provisioning of the eUICC may include several basic units such as a mobile network operator (MNO) server, a subscription manager-data preparing (SM-DP), a subscription management-secure routing (SM-SR), the eUICC, an eUICC manufacturer (EUM), and a certificate issuer (CI). The MNO server may control the SM-DP and SM-SR.

The SM-DP is mainly responsible for generating a profile. Further, the SM-DP is responsible for generating a profile, downloading the profile, and installing the profile to the eUICC. The profile includes a file structure, data, and an application, and is provisioned into an eUICC. When the profile in the eUICC is enabled, access to a specific mobile network can be supported. The profile may be considered as a remote provisioning file of the eUICC, a home network operator file, or a user file. The profile may also be considered as a SIM file. The SM-DP may also be known as a profile provisioner.

The SM-SR is mainly responsible for secure routing and transmission of a profile, and the SM-SR may also manage the profile in the eUICC. The SM-SR may also be known as a profile manager.

The MNO server needs to request a service from the SM-SR and the SM-DP, for example, subscribing to a profile from the SM-DP and requesting the SM-SR to manage the profile in the eUICC (such as enabling, disabling, or deleting the profile).

The entire system is interconnected according to functions of each unit and interfaces between these units, where the interfaces include an ES1 interface configured to register an eUICC with the SM-SR, an ES2 interface configured to obtain personalized data from the MNO server, ES3, ES4, ES5, ES6, ES8 interfaces configured to download and install a profile using the SM-DP, and enable, disable, or delete the profile using the SM-DP or the SM-DR, and an ES7* interface configured to switch the SM-SR, which is not further described herein.

Based on the remote provisioning system of the eUICC shown in FIG. 1, the embodiments of the present disclosure provide a method for migration from a SIM card to an eUICC, a device, and a system in order to resolve a requirement that a user of a compatible terminal needs to migrate from a SIM card to an eUICC during a transition period. The following separately provides descriptions in detail.

In the embodiments of the present disclosure, the compatible terminal is a terminal that is embedded with an eUICC and that has at least one SIM card slot or card tray. The compatible terminal supports a SIM card, and may be able to identify and use an eUICC of a SIM card form.

Figure 2:
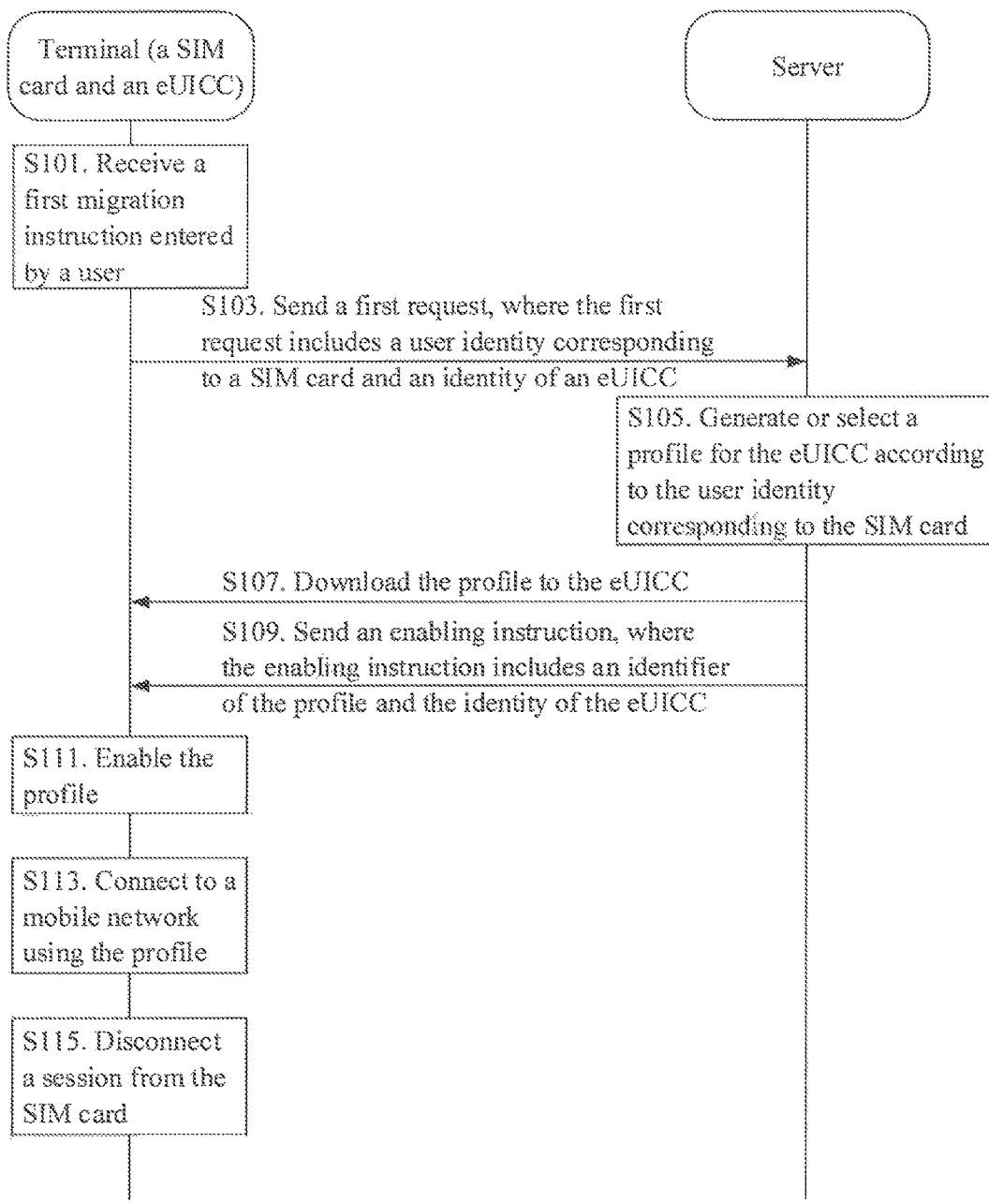
FIG. 2 is a schematic flowchart of a first embodiment of a method for migration from a SIM card to an eUICC according to the embodiments of the present disclosure.

Referring to FIG. 2, FIG. 2 is a schematic flowchart of a first embodiment of a method for migration from a SIM card to an eUICC according to the embodiments of the present disclosure. As shown in FIG. 2, the method includes the following steps.

Step S101: A terminal receives a first migration instruction entered by a user, where the first migration instruction is used to instruct the terminal to migrate from a SIM card to an eUICC.

The first migration instruction may be an instruction generated by means of a key operation, a touch operation, a gesture operation, a voice control operation, or the like. This is not limited in this embodiment of the present disclosure.

Step S103: The terminal sends a first request to a server in response to the first migration instruction, where the first request includes a user identity corresponding to the SIM card and an identity of the eUICC such that the server generates or selects a profile for the eUICC according to the user identity. The user identity may be an IMSI, a temporary mobile subscriber identity (TMSI), a packet TMSI (P-TMSI), a mobile station international Integrated Services Digital Network (ISDN) number (MSISDN), an integrated circuit card identifier (ICCID), or the like.

Step S105: Correspondingly, after receiving the first request sent by the terminal, the server generates or selects a profile for the eUICC according to the user identity corresponding to the SIM card. The server may generate the profile according to subscription data corresponding to the user identity. The subscription data is in a home location register (HLR) or a home subscriber server (HSS).

Step S107: After generating the profile, the server downloads the profile to the eUICC. Correspondingly, the terminal downloads the profile from the server to the eUICC. Here, the eUICC is an eUICC indicated by the identity of the eUICC in the first request.

Step S109: Optionally, after downloading the profile to the eUICC, the server sends an enabling instruction to the terminal, where the enabling instruction includes an identifier of the profile and the identity of the eUICC and is used to enable the profile in the eUICC.

Step S111: The terminal receives the enabling instruction sent by the server, and enables the profile in response to the enabling instruction. Here, the profile is a profile indicated by the identifier of the profile in the enabling instruction, and the eUICC is an eUICC indicated by the identity of the eUICC in the enabling instruction.

In an embodiment, the enabling instruction may be from the server, or may be an enabling instruction entered by an end user using the terminal.

After downloading the profile from the server to the eUICC, the terminal may prompt the user to enable the profile. The user may enter the enabling instruction according to the prompt, to trigger the terminal to enable the profile.

For a man-machine interaction process in which the user enters the enabling instruction using the terminal, this embodiment of the present disclosure sets no limitation.

It should be noted that, in actual application, after the profile is downloaded to the eUICC, in addition to triggering enabling of the profile according to the enabling instruction sent out by the server or the user, the terminal may automatically trigger enabling of the profile, to ensure that the profile is enabled.

Step S113: After successfully enabling the profile, the terminal may be connected to a mobile network using the profile. Here, the mobile network may be a mobile communications network device such as a base station, a gateway, or a switch. It should be understood that an IMSI corresponding to the profile may be an IMSI corresponding to the SIM card.

Step S115: After being connected to the mobile network using the profile, the terminal may disconnect a session from the SIM card.

The terminal in this embodiment of the present disclosure is the compatible terminal. The server in this embodiment of the present disclosure may be multiple servers in the remote provisioning system of the eUICC, and further includes an MNO server, an SM-DP, and an SM-SR. The MNO server may include an operation support system (OSS), a short message service center (SMSC), an HSS, and the like. The SM-DP and the SM-SR may be controlled or operated by the MNO server.

Further, when the terminal is powered on (that is, before the foregoing steps are executed), the terminal may initialize the SIM card, and accesses the mobile network using the SIM card in order to establish a connection to the MNO server, the SM-SR, and the SM-DP. The terminal may initialize the eUICC. The eUICC may include an initial profile (which may be referred to as a provisioning profile), and the terminal may access the mobile network using the initial profile. At the same time, the eUICC may perform two-way authentication with the SM-SR to establish a secure connection. It should be understood that the initial profile is a service-restricted profile.

In an implementation of this embodiment of the present disclosure, the terminal may send the first request to the SM-SR using a secure connection between the eUICC and the SM-SR, and further, the SM-SR forwards the first request to the MNO server. After receiving the first request, the MNO server may verify whether the user identity corresponding to the SIM card in the first request is valid. If the user identity corresponding to the SIM card is valid, the MNO server may extract, from the subscription data corresponding to the user identity, service information and identities such as an IMSI and an MSISDN, and request, according to the extracted service information and identities, the SM-DP to generate and download the profile to the eUICC. Further, the MNO server may request the SM-SR to enable the profile.

In an implementation of this embodiment of the present disclosure, after requesting the SM-DP to generate and download the profile to the eUICC and requesting the SM-SR to enable the profile, the MNO server may further write a new root key into the subscription data corresponding to the user identity, and disable an old root key such that the root key (the new root key) in the subscription data is different from a root key in the SIM card. As a result, authentication between the SIM card and the mobile network fails, and the SIM card cannot be connected to the mobile network. This can avoid that after accessing the mobile network using the eUICC, the terminal remains connected to the mobile network using the SIM card.

In an implementation of this embodiment of the present disclosure, after requesting the SM-DP to generate and download the profile to the eUICC, and requesting the SM-SR to enable the profile, the MNO server may further send a first IMSI change instruction to the terminal. The first IMSI change instruction includes an invalid IMSI such that an existing IMSI of the SIM card is overwritten by the invalid IMSI. Correspondingly, the terminal receives the first IMSI change instruction, and overwrites the existing IMSI of the SIM card with the invalid IMSI such that the SIM card is invalid. This can avoid that after accessing the mobile network using the eUICC, the terminal remains connected to the mobile network using the SIM card. It can be understood that, making the SIM card invalid can further prevent the user from using another terminal to connect to a network using the SIM card, and effectively avoid an IMSI conflict or invalid signaling consumption in the network.

By means of implementing this embodiment of the present disclosure, a server is requested to generate a profile according to a user identity corresponding to a SIM card, and to download the profile to an eUICC, a mobile network is accessed using the profile after the profile is enabled successfully, and a session between a terminal and the SIM card is disconnected. This can implement migration from the SIM card to the eUICC.

Figure 3:
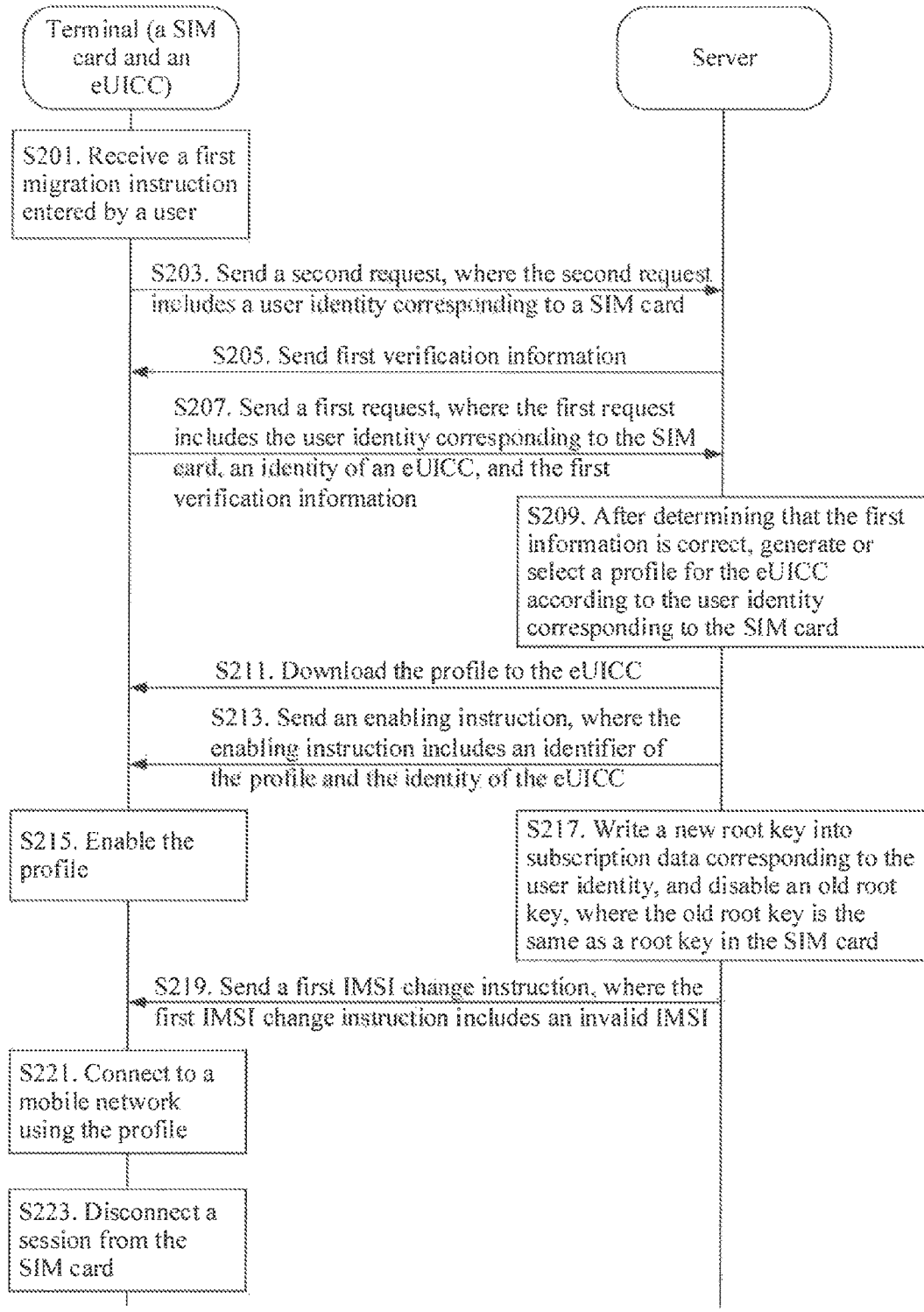
FIG. 3 is a schematic flowchart of a second embodiment of a method for migration from a SIM card to an eUICC according to the embodiments of the present disclosure.

Referring to FIG. 3, FIG. 3 is a schematic flowchart of a second embodiment of a method for migration from a SIM card to an eUICC according to the embodiments of the present disclosure. According to the embodiment in FIG. 3, before the profile is generated according to the first request sent by the terminal, the server may further perform identity verification on the SIM card to avoid that another terminal steals the user identity corresponding to the SIM card for sending the first request. This ensures correctness of migration from the SIM card to the eUICC for the terminal. The method shown in FIG. 3 is an improvement to the method shown in FIG. 2. For content that is not mentioned in the embodiment corresponding to FIG. 3, reference may be made to the description of the embodiment corresponding to FIG. 2. Referring to FIG. 3, the method includes the following steps.

Step S201: A terminal receives a first migration instruction entered by a user, where the first migration instruction is used to instruct the terminal to migrate from a SIM card to an eUICC.

The first migration instruction may be an instruction generated by means of a key operation, a touch operation, a gesture operation, a voice control operation, or the like. This is not limited in this embodiment of the present disclosure.

Step S203: The terminal sends a second request to a server in response to the first migration instruction, where the second request includes a user identity corresponding to the SIM card.

Step S205: Correspondingly, after receiving the second request sent by the terminal, the server may send first verification information to the terminal.

In an implementation of this embodiment of the present disclosure, the server may send the first verification information to the terminal using a predetermined source number (for example, a SMSC number 1380010050 of Beijing Mobile).

In another implementation of this embodiment of the present disclosure, the server may directly send the first verification information to the SIM card. The terminal needs to intercept the first verification information, instead of forwarding the first verification information to the SIM card.

It should be noted that the first verification information in the first request may be obtained in another manner. For example, an end user requests, by phone to obtain the first verification information from an MNO server, and the MNO server sends the first verification information to a terminal using a short message.

Step S207: Correspondingly, after receiving the first verification information sent by the server, the terminal sends a first request to the server, where the first request includes the user identity corresponding to the SIM card, an identity of the eUICC, and the first verification information such that the server generates or selects a profile for the eUICC according to the user identity.

Step S209: Correspondingly, after the server receives the first request sent by the terminal and determines that the first verification information in the first request is correct, the server generates or selects the profile for the eUICC according to the user identity corresponding to the SIM card. The server may generate the profile according to subscription data corresponding to the user identity. For a specific generation procedure, reference may be made to related content in the embodiment in FIG. 2. Details are not further described herein.

Step S211: After generating the profile, the server downloads the profile to the eUICC. Correspondingly, the terminal downloads the profile from the server to the eUICC. Here, the eUICC is an eUICC indicated by the identity of the eUICC in the first request.

Step S213: Optionally, after downloading the profile to the eUICC, the server sends an enabling instruction to the terminal, where the enabling instruction includes an identifier of the profile and the identity of the eUICC and is used to enable the profile in the eUICC.

Step S215: Correspondingly, the terminal receives the enabling instruction sent by the server, and enables the profile in response to the enabling instruction. Here, the profile is a profile indicated by the identifier of the profile in the enabling instruction, and the eUICC is an eUICC indicated by the identity of the eUICC in the enabling instruction.

In actual application, the enabling instruction may be from the server, or may be an enabling instruction entered by an end user using the terminal.

After downloading the profile from the server to the eUICC, the terminal may prompt the user to enable the profile. The user may enter the enabling instruction according to the prompt to trigger the terminal to enable the profile.

For a man-machine interaction process in which the user enters the enabling instruction using the terminal, this embodiment of the present disclosure sets no limitation.

It should be noted that, in actual application, after the profile is downloaded to the eUICC, in addition to triggering enabling of the profile according to the enabling instruction sent out by the server or the user, the terminal may automatically trigger enabling of the profile, to ensure that the profile is enabled.

Step S217: Optionally, after sending the enabling instruction to the terminal, the server writes a new root key into subscription data corresponding to the user identity, and disables an old root key, where the old root key is the same as a root key in the SIM card.

Step S219: Optionally, after sending the enabling instruction to the terminal, the server sends a first IMSI change instruction, where the first IMSI change instruction includes an invalid IMSI. Correspondingly, the terminal receives the first IMSI change instruction sent by the server such that the invalid IMSI is written into the SIM card.

Step S221: After successfully enabling the profile, the terminal may be connected to a mobile network using the profile. Here, the mobile network may be a mobile communications network device such as a base station, a gateway, or a switch. It should be understood that an IMSI corresponding to the profile may be an IMSI corresponding to the SIM card.

Step S223: After being connected to the mobile network using the profile, the terminal may disconnect a session from the SIM card.

In an implementation of this embodiment of the present disclosure, the terminal may send the second request to the SM-SR using a secure connection between the eUICC and the SM-SR, and further, the SM-SR forwards the second request to the MNO server. After receiving the second request, the MNO server may verify whether the user identity corresponding to the SIM card in the second request is valid. If the user identity corresponding to the SIM card is valid, the MNO server may send the first verification information to the terminal, to avoid that another terminal steals the user identity corresponding to the SIM card for sending the first request. This ensures correctness of migration from the SIM card to the eUICC.

In an implementation of this embodiment of the present disclosure, the terminal may send the first request to the SM-SR using a secure connection between the eUICC and the SM-SR, and further, the SM-SR forwards the first request to the MNO server. After receiving the first request, the MNO server may verify whether the first verification information in the first request is correct. If the first verification information is correct, the MNO server may extract, from the subscription data corresponding to the user identity, service information and identities such as an IMSI and an MSISDN, and request, according to the extracted service information and identities, the SM-DP to generate and download the profile to the eUICC. Further, the MNO server may request the SM-SR to enable the profile.

In an implementation of this embodiment of the present disclosure, after requesting the SM-DP to generate and download the profile to the eUICC and requesting the SM-SR to enable the profile, the MNO server may further write the new root key into the subscription data corresponding to the user identity, and disable the old root key such that the root key (the new root key) in the subscription data is different from the root key in the SIM card. As a result, authentication between the SIM card and the mobile network fails, and the SIM card cannot be connected to the mobile network. This can avoid that after accessing the mobile network using the eUICC, the terminal remains connected to the mobile network using the SIM card.

In an implementation of this embodiment of the present disclosure, after requesting the SM-DP to generate and download the profile to the eUICC, and requesting the SM-SR to enable the profile, the MNO server may further send a first IMSI change instruction to the terminal. The first IMSI change instruction includes an invalid IMSI such that an existing IMSI of the SIM card is overwritten by the invalid IMSI. Correspondingly, the terminal receives the first IMSI change instruction, and overwrites the existing IMSI of the SIM card with the invalid IMSI such that the SIM card is invalid. This can avoid that after accessing the mobile network using the eUICC, the terminal remains connected to the mobile network using the SIM card. It can be understood that, making the SIM card invalid can further prevent the user from using another terminal to connect to a network using the SIM card, and effectively avoid an IMSI conflict or invalid signaling consumption in the network.

By means of implementing this embodiment of the present disclosure, before generating the profile according to the first request sent by the terminal, the server may further perform identity verification on the SIM card to avoid that another terminal steals the user identity corresponding to the SIM card for sending the first request. This further ensures correctness of migration from the SIM card to the eUICC.

Figure 4:
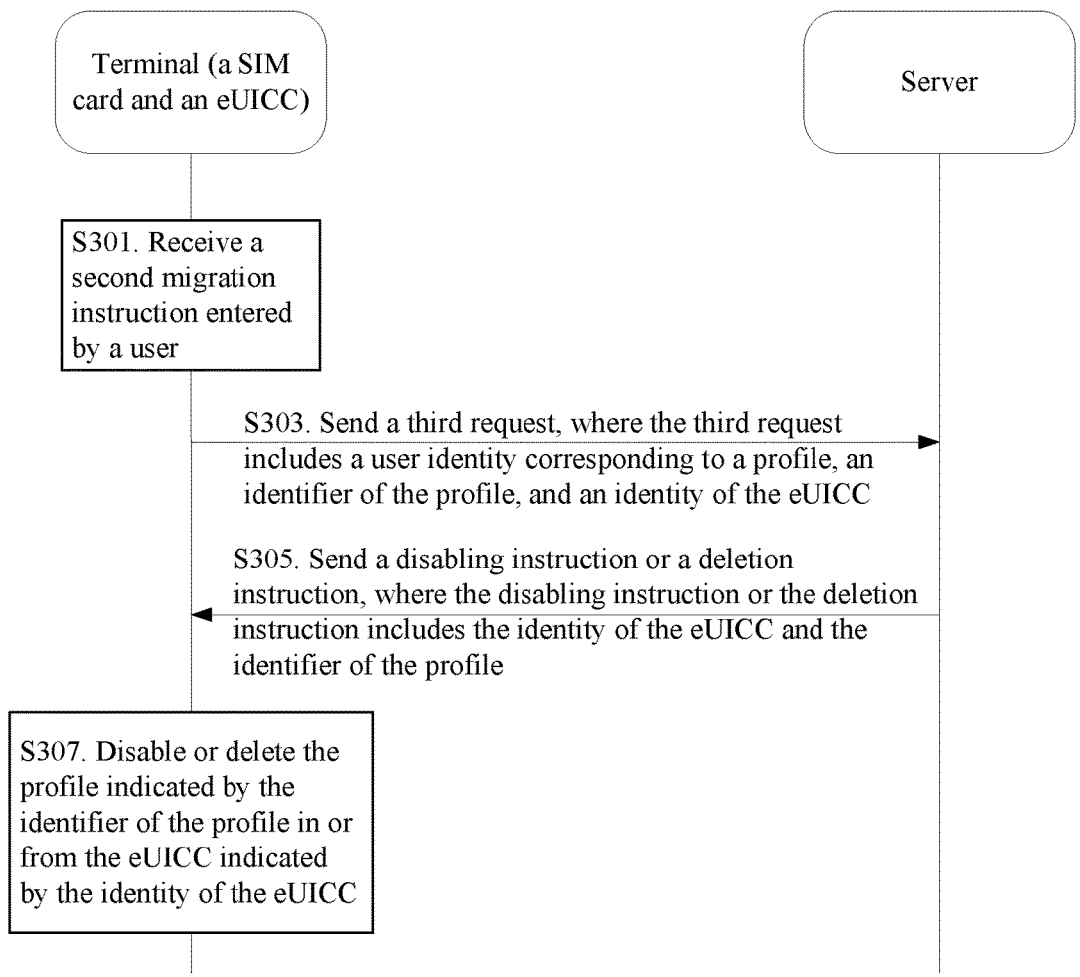
FIG. 4 is a schematic flowchart of a method for reverse migration from an eUICC to a SIM card according to an embodiment of the present disclosure.

The following further describes a method for migration from the eUICC back to the SIM card for the terminal after the terminal implements migration from the SIM card to the eUICC such that the end user can still use the SIM card to access the mobile network. As shown in FIG. 4, the method includes the following steps.

Step S301: The terminal receives a second migration instruction entered by a user, where the second migration instruction is used to instruct to migrate from the eUICC to the SIM card.

Step S303: The terminal sends a third request to the server in response to the second migration instruction, where the third request includes a user identity corresponding to the profile, an identifier of the profile, and the identity of the eUICC. It should be understood that an IMSI corresponding to the profile may be an IMSI corresponding to the SIM card.

Step S305: Correspondingly, the server receives the third request sent by the terminal, and sends a disabling instruction or a deletion instruction to the terminal, where the disabling instruction or the deletion instruction includes the identity of the eUICC and the identifier of the profile. Here, the profile is a profile indicated by the identifier of the profile in the eUICC indicated by the identity of the eUICC.

Step S307: Correspondingly, the terminal receives the disabling instruction or the deletion instruction sent by the server. Further, in response to the disabling instruction, the terminal disables the profile indicated by the identifier of the profile in the eUICC indicated by the identity of the eUICC. Alternatively, in response to the deletion instruction, the terminal deletes the profile indicated by the identifier of the profile from the eUICC indicated by the identity of the eUICC.

In an implementation of this embodiment of the present disclosure, the terminal may send the third request to the SM-SR using a secure connection between the eUICC and the SM-SR, and further, the SM-SR forwards the third request to the MNO server. After receiving the third request, the MNO server may request the SM-SR to disable or delete the profile in the eUICC.

In an implementation of this embodiment of the present disclosure, if the SIM card is set to an invalid SIM card in a process in which the terminal implements migration from the SIM card to the eUICC, before the MNO server requests the SM-SR to disable or delete the profile in the eUICC, the MNO server may further send a second IMSI change instruction to the terminal. The second IMSI change instruction includes a valid IMSI. Correspondingly, the terminal receives the second IMSI change instruction sent by the server, and writes the valid IMSI into the SIM card such that the SIM card is restored to a valid SIM card, allowing the terminal to access the mobile network using the SIM card.

In an implementation of this embodiment of the present disclosure, if in a process in which the terminal implements migration from the SIM card to the eUICC, the new root key is written into the subscription data corresponding to the user identity (the old key is disabled), after the MNO server requests the SM-SR to disable or delete the profile in the eUICC, the MNO server may enable the old root key in the subscription data such that the SIM card and the mobile network (the subscription data) share the same root key. In this way, after the profile is disabled or deleted, the terminal can be authenticated by the mobile network using the SIM card, and finally can access the mobile network successfully using the SIM card.

Figure 5:
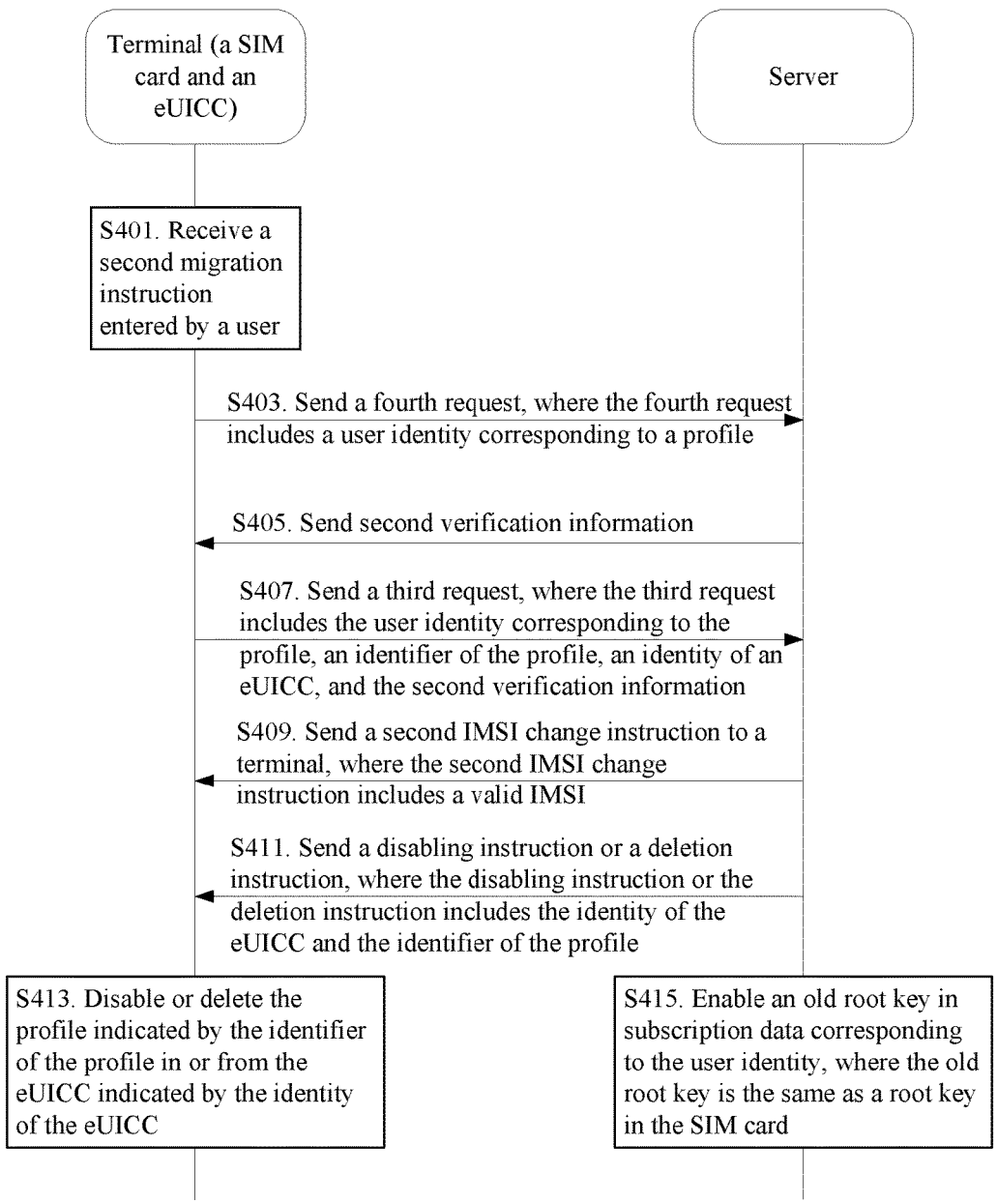
FIG. 5 is a schematic flowchart of another method for reverse migration from an eUICC to a SIM card according to an embodiment of the present disclosure.

Further, the method for migration from the eUICC back to the SIM card may be shown in FIG. 5. In the method shown in FIG. 5, before the profile is disabled or deleted according to the third request sent by the terminal, the server may further perform identity verification on the eUICC to avoid that another terminal steals the user identity corresponding to the profile for sending the third request. This ensures correctness of migration from the SIM card to the eUICC for the terminal. The method shown in FIG. 5 is an improvement to the method shown in FIG. 4. For content that is not mentioned in the method in FIG. 5, reference may be made to the method in FIG. 4. Referring to FIG. 5, the method includes the following steps.

Step S401: The terminal receives a second migration instruction entered by a user, where the second migration instruction is used to instruct to migrate from the eUICC to the SIM card.

Step S403: The terminal sends a fourth request to the server in response to the second migration instruction, where the fourth request includes the user identity corresponding to the profile.

Step S405: Correspondingly, the server receives the fourth request sent by the terminal, and sends second verification information to the terminal.

In an implementation of this embodiment of the present disclosure, the server may send the second verification information to the terminal using a predetermined source number (for example, a SMSC number 1380010050 of Beijing Mobile).

In another implementation of this embodiment of the present disclosure, the server may directly send the second verification information to the SIM card. The terminal needs to intercept the second verification information, instead of forwarding the second verification information to the SIM card.

It should be noted that the second verification information in the third request may be obtained in another manner. For example, an end user requests, by phone to obtain the second verification information from an MNO server, and an MNO server sends the second verification information to a terminal using a short message.

Step S407: Correspondingly, the terminal receives the second verification information sent by the server, and sends a third request to the server, where the third request includes the user identity corresponding to the profile, an identifier of the profile, an identity of the eUICC, and the second verification information.

Step S409: Correspondingly, the server receives the third request sent by the terminal. Optionally, the server may send a second IMSI change instruction to the terminal. The second IMSI change instruction includes a valid IMSI. Correspondingly, the terminal receives the second IMSI change instruction, and writes the valid IMSI into the SIM card such that the SIM card is restored to a valid SIM card, allowing the terminal to access the mobile network using the SIM card.

Step S411: After receiving the third request sent by the terminal, the server sends a disabling instruction or a deletion instruction to the terminal, where the disabling instruction or the deletion instruction includes the identity of the eUICC and the identifier of the profile. Here, the profile is a profile indicated by the identifier of the profile in the eUICC indicated by the identity of the eUICC.

Step S413: Correspondingly, the terminal receives the disabling instruction or the deletion instruction sent by the server and in response to the disabling instruction, the terminal disables the profile indicated by the identifier of the profile in the eUICC indicated by the identity of the eUICC. Alternatively, in response to the deletion instruction, the terminal deletes the profile indicated by the identifier of the profile from the eUICC indicated by the identity of the eUICC.

Step S415: Optionally, after sending the disabling instruction or the deletion instruction to the terminal, the server enables an old root key in subscription data corresponding to the user identity, where the old root key is the same as a root key in the SIM card. In this way, after the profile is disabled or deleted, the terminal can be authenticated by the network using the SIM card, and finally can access the mobile network successfully using the SIM card.

In an implementation of this embodiment of the present disclosure, the terminal may send the fourth request to the SM-SR using a secure connection between the eUICC and the SM-SR, and further, the SM-SR forwards the fourth request to the MNO server. After receiving the second request, the MNO server may verify whether the user identity corresponding to the profile in the fourth request is valid. If the user identity corresponding to the profile is valid, the MNO server may send the second verification information to the terminal, to avoid that another terminal steals the user identity corresponding to the profile for sending the third request. This ensures correctness of migration from the SIM card to the eUICC for the terminal.

In an implementation of this embodiment of the present disclosure, after receiving the third request, the MNO server may verify whether the second verification information in the third request is correct. If the second verification information is correct, the SM-SR is requested to disable or delete the profile in the eUICC.

Figure 6:
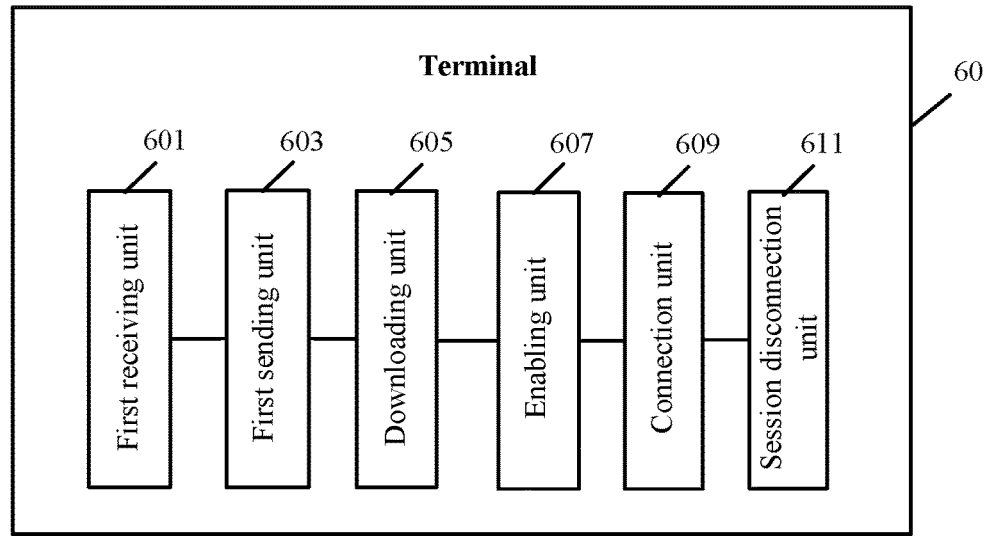
FIG. 6 is a schematic structural diagram of a first embodiment of a terminal according to the embodiments of the present disclosure.

Referring to FIG. 6, FIG. 6 is a schematic structural diagram of a first embodiment of a terminal 60 according to the embodiments of the present disclosure. The terminal 60 shown in FIG. 6 may include a first receiving unit 601, a first sending unit 603, a downloading unit 605, an enabling unit 607, a connection unit 609, and a session disconnection unit 611.

The first receiving unit 601 is configured to receive a first migration instruction entered by a user. The first migration instruction is used to instruct to migrate from a SIM card to an eUICC.

The first sending unit 603 is configured to send a first request to a server in response to the first migration instruction. The first request includes a user identity corresponding to the SIM card and an identity of the eUICC such that the server generates or selects a profile for the eUICC according to the user identity.

The downloading unit 605 is configured to download the profile from the server to the eUICC.

The enabling unit 607 is configured to enable the profile in response to the enabling instruction.

The connection unit 609 is configured to access a mobile network using the profile after the profile is enabled successfully.

The session disconnection unit 611 is configured to disconnect a session from the SIM card.

In an implementation of this embodiment of the present disclosure, in addition to including the first receiving unit 601, the first sending unit 603, the downloading unit 605, the enabling unit 607, the connection unit 609, and the session disconnection unit 611, the terminal 60 may include a third receiving unit (not shown). The third receiving unit is configured to, before the session disconnection unit 611 disconnects the session from the SIM card, receive a first IMSI change instruction sent by the server, and overwrite an existing IMSI of the SIM card with the invalid IMSI such that the SIM card is invalid. This can avoid that after accessing the mobile network using the eUICC, the terminal 60 remains connected to the mobile network using the SIM card. It can be understood that making the SIM card invalid can further avoid that the user uses another terminal to connect to a network using the SIM card, and effectively avoid an IMSI conflict in the network.

In this embodiment of the present disclosure, the first request may further include first verification information. The first verification information may be from the server.

Further, in addition to including the first receiving unit 601, the first sending unit 603, the downloading unit 605, the enabling unit 607, the connection unit 609, and the session disconnection unit 611, the terminal 60 may include a second sending unit (not shown). The second sending unit is configured to, before the first sending unit 603 sends the first request to the server, send a second request to the server. The second request includes the user identity corresponding to the SIM card such that the server sends the first verification information to the terminal 60 or the SIM card using the user identity corresponding to the SIM card.

In actual application, the first verification information may be further obtained in another manner. For example, an end user requests, by phone to obtain the first verification information from an MNO server, and the MNO server sends the first verification information to the terminal 60 using a short message.

After migrating from the SIM card to the eUICC, the terminal 60 may further migrate from the eUICC back to the SIM card.

The first receiving unit 601 may be further configured to, after the session disconnection unit 611 disconnects the session from the SIM card, receive a second migration instruction entered by the user. The second migration instruction is used to instruct to migrate from the eUICC to the SIM card.

The first sending unit 603 may be further configured to send a third request to the server in response to the second migration instruction. The third request includes a user identity corresponding to the profile, an identifier of the profile, and the identity of the eUICC.

Figure 7:
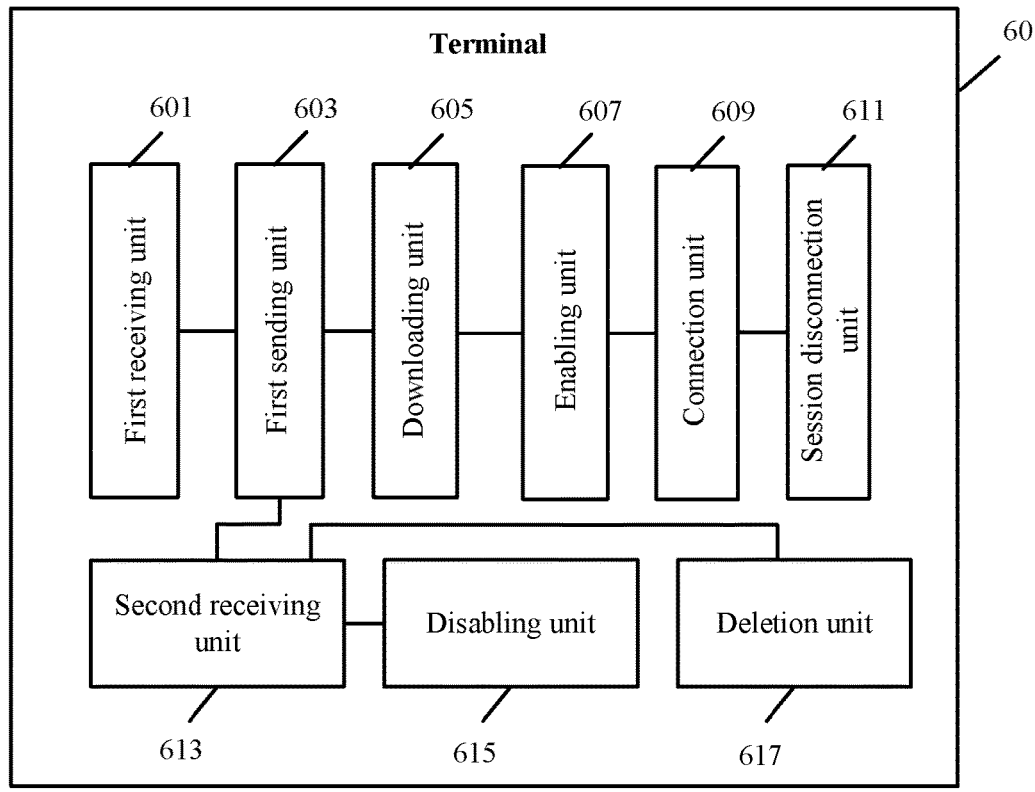
FIG. 7 is a schematic structural diagram of a second embodiment of a terminal according to the embodiments of the present disclosure.

Further, as shown in FIG. 7, in addition to including the first receiving unit 601, the first sending unit 603, the downloading unit 605, the enabling unit 607, the connection unit 609, and the session disconnection unit 611, the terminal 60 may include a second receiving unit 613, and a disabling unit 615 or a deletion unit 617.

The second receiving unit 613 is configured to receive a disabling instruction or a deletion instruction sent by the server. The disabling instruction or the deletion instruction includes the identity of the eUICC and the identifier of the profile.

The disabling unit 615 is configured to disable the profile in response to the disabling instruction.

The deletion unit 617 is configured to delete the profile in response to the deletion instruction.

In an implementation of this embodiment of the present disclosure, the terminal 60 shown in FIG. 7 may further include a fourth receiving unit (not shown). The fourth receiving unit may be further configured to, before the second receiving unit 613 receives the disabling instruction or the deletion instruction sent by the server, receive a second IMSI change instruction sent by the server in order to write a valid IMSI into the SIM card.

In this embodiment of the present disclosure, the third request may further include second verification information. The second verification information may be from the server.

The terminal 60 shown in FIG. 7 may further include a third sending unit (not shown). The third sending unit may be configured to, before the first sending unit 603 sends the third request to the server, send a fourth request. The fourth request includes the user identity corresponding to the profile such that the server sends the second verification information to the terminal 60 or the eUICC using the user identity corresponding to the profile.

In an embodiment, the second verification information may be further obtained in another manner. For example, an end user requests, by phone to obtain the second verification information from an MNO server, and the MNO server sends the second verification information to the terminal 60 using a short message.

It can be understood that, functions of functional modules in the terminal 60 may be further implemented according to the methods in the method embodiments corresponding to FIG. 2 to FIG. 5 respectively. Details are not further described herein.

Figure 8:
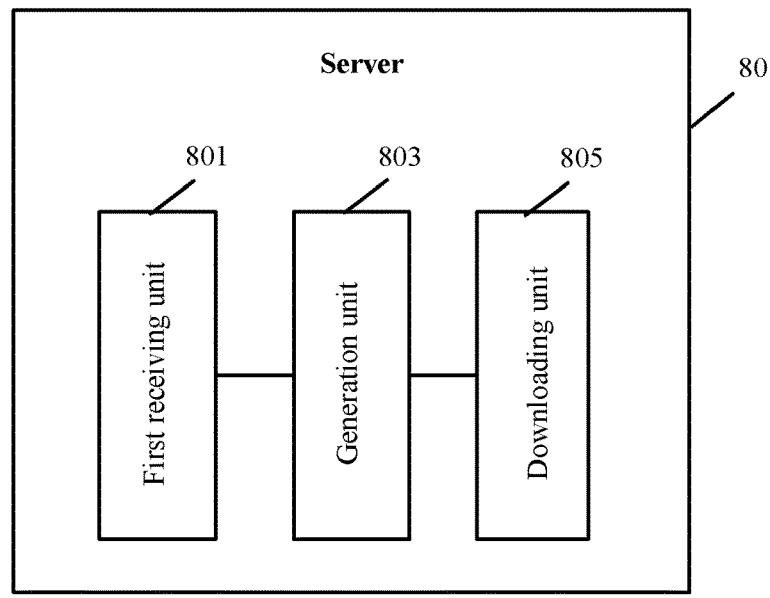
FIG. 8 is a schematic structural diagram of a first embodiment of a server according to the embodiments of the present disclosure.

Referring to FIG. 8, FIG. 8 is a schematic structural diagram of a first embodiment of a server 80 according to the embodiments of the present disclosure. The server 80 shown in FIG. 8 may include a first receiving unit 801, a generation unit 803, and a downloading unit 805.

The first receiving unit 801 is configured to receive a first request sent by a terminal. The first request includes a user identity corresponding to a SIM card in the terminal and an identity of an eUICC in the terminal.

The generation unit 803 is configured to generate or select a profile for the eUICC according to the user identity corresponding to the SIM card in response to the first request.

The downloading unit 805 is configured to download the profile to the eUICC.

Further, in addition to including the first receiving unit 801, the generation unit 803, and the downloading unit 805, the server 80 may include a first root key processing unit (not shown) and/or a first sending unit (not shown).

The first root key processing unit is configured to, after the generation unit 803 generates or selects the profile for the eUICC according to the user identity corresponding to the SIM card and the downloading unit 805 downloads the profile to the eUICC, write a new root key into subscription data corresponding to the user identity, and disable an old root key such that the root key (i.e., the new root key) in the subscription data is different from a root key in the SIM card. As a result, authentication between the SIM card and a mobile network fails, and the SIM card cannot be connected to the mobile network. This can avoid that after accessing the mobile network using the eUICC, the terminal remains connected to the mobile network using the SIM card.

The first sending unit is configured to send a first IMSI change instruction to the terminal. The first IMSI change instruction includes an invalid IMSI such that an existing IMSI of the SIM card is overwritten by the invalid IMSI.

In this embodiment of the present disclosure, the first request may further include first verification information. The first verification information may be sent by the server.

Further, in addition to including the first receiving unit 801, the generation unit 803, and the downloading unit 805, the server 80 may include a second receiving unit (not shown) and a second sending unit (not shown).

The second receiving unit is configured to, before the first receiving unit 801 receives the first request sent by the terminal, receive a second request sent by the terminal. The second request includes the user identity corresponding to the SIM card.

The second sending unit is configured to send the first verification information to the terminal or the SIM card in response to the second request.

Further, after the terminal accesses the mobile network using the profile, the server 80 may further receive a request sent by the terminal for migration from the eUICC back to the SIM card. Further The first receiving unit 801 may be further configured to, after the generation unit 803 generates or selects the profile for the eUICC according to the user identity corresponding to the SIM card and the downloading unit 805 downloads the profile to the eUICC, receive a third request sent by the terminal. The third request includes a user identity corresponding to the profile, an identifier of the profile, and the identity of the eUICC.

Figure 9:
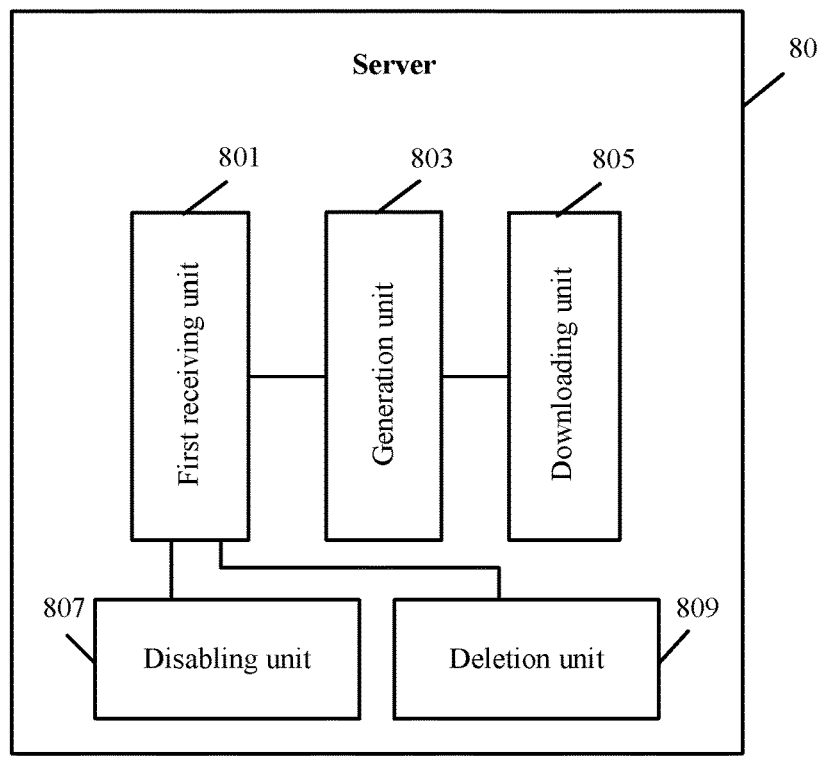
FIG. 9 is a schematic structural diagram of a second embodiment of a server according to the embodiments of the present disclosure.

Further, as shown in FIG. 9, in addition to including the first receiving unit 801, the generation unit 803, and the downloading unit 805, the server 80 may include a disabling unit 807 or a deletion unit 809.

The disabling unit 807 is configured to send a disabling instruction to the terminal in response to the third request to disable the profile. The disabling instruction includes the identity of the eUICC and the identifier of the profile.

The deletion unit 809 is configured to send a deletion instruction to the terminal in response to the third request to delete the profile. The deletion instruction includes the identity of the eUICC and the identifier of the profile.

Further, in addition to including the first receiving unit 801, the generation unit 803, and the downloading unit 805, the server 80 shown in FIG. 9 may include a third sending unit (not shown) and a second root key processing unit (not shown).

The third sending unit is configured to, before the disabling unit 807 sends the disabling instruction to the terminal or the deletion unit 809 sends the deletion instruction to the terminal, send a second IMSI change instruction to the terminal. The second IMSI change instruction includes a valid IMSI such that the valid IMSI is written into the SIM card, and the SIM card is restored to a valid SIM card, allowing the terminal to access the mobile network using the SIM card.

The second root key processing unit is configured to, after the disabling unit 807 sends the disabling instruction to the terminal or the deletion unit 809 sends the deletion instruction to the terminal, enable the old root key in the subscription data corresponding to the user identity. In this way, after the profile is disabled or deleted, the terminal can be authenticated by the mobile network using the SIM card, and finally can access the mobile network successfully using the SIM card.

In this embodiment of the present disclosure, the third request may further include second verification information. The second verification information may be sent by the server.

Further, in addition to including the first receiving unit 801, the generation unit 803, and the downloading unit 805, the server 80 may include a third receiving unit (not shown) and a fourth sending unit (not shown).

The third receiving unit is configured to, before the first receiving unit 801 receives the third request sent by the terminal, receive a fourth request sent by the terminal. The fourth request includes the user identity corresponding to the profile.

The fourth sending unit is configured to, in response to the fourth request, send the second verification information to the terminal or the eUICC according to the user identity.

It can be understood that, functions of functional modules in the server 80 may be further implemented according to the methods in the method embodiments corresponding to FIG. 2 to FIG. 5 respectively. Details are not further described herein.

Figure 10:
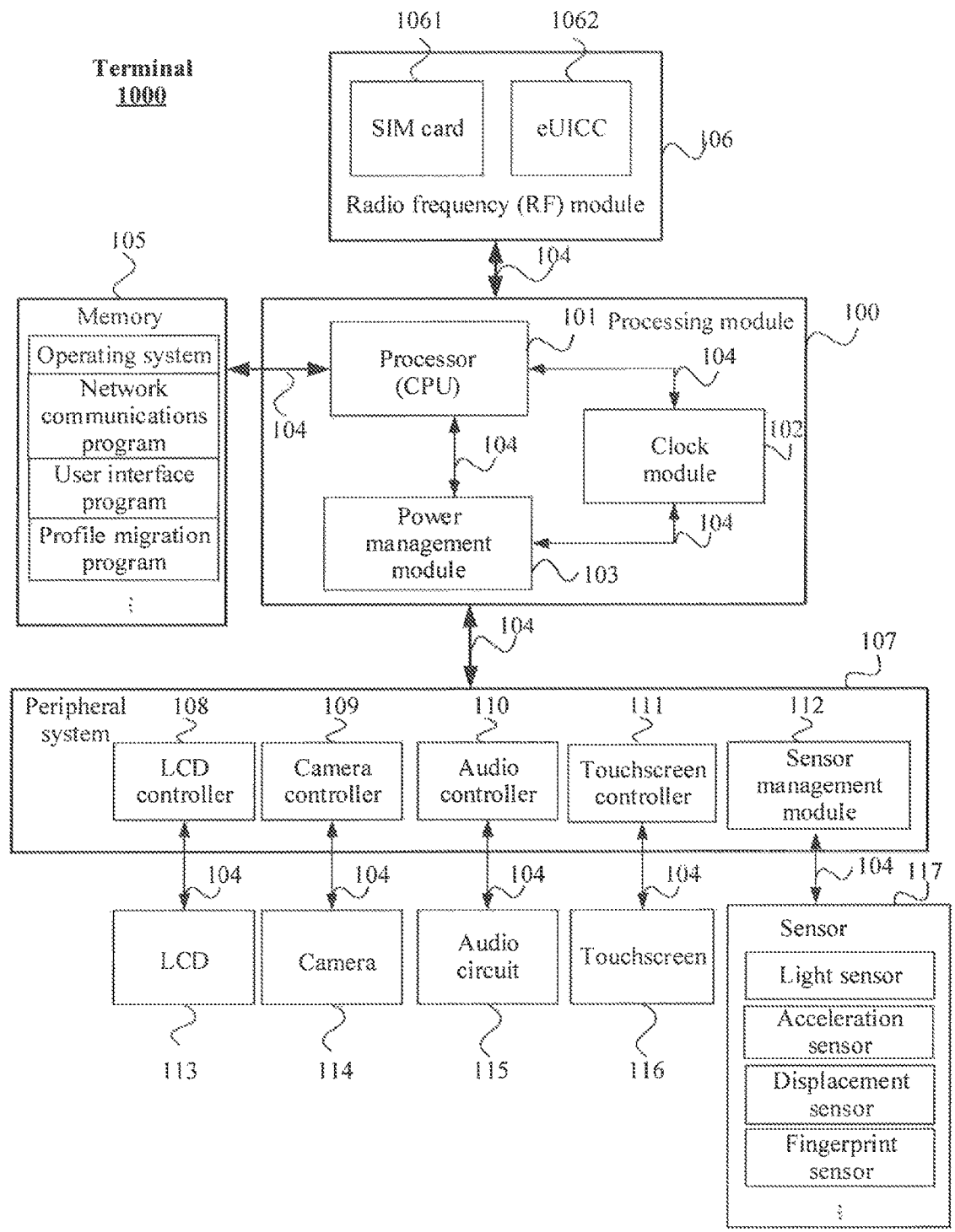
FIG. 10 is a schematic structural diagram of a third embodiment of a terminal according to the embodiments of the present disclosure.

For ease of implementing the embodiments of the present disclosure, the present disclosure provides a hardware structure for implementing a terminal. Referring to FIG. 10, FIG. 10 is a schematic structural diagram of a third embodiment of a terminal 1000 according to the embodiments of the present disclosure. Referring to FIG. 10, a terminal 1000 may include a processing module 100, a memory 105 (which may include one or more computer readable storage media), a radio frequency (RF) module 106, a peripheral system 107, a display (i.e., liquid crystal display (LCD)) 113, a camera 114, an audio circuit 115, a touchscreen 116, and a sensor 117 (which may include one or more sensors such as a light sensor, an acceleration sensor, a displacement sensor, and a fingerprint sensor). One or more processors (such as a central processing unit (CPU)) 101, a clock module 102, and a power management module 103 may be integrated into the processing module 100. These components may communicate over one or more communication buses 104.

It should be understood that the terminal 1000 is merely an example of the present disclosure. Moreover, the terminal 1000 may have more or less components than those shown, may combine two or more components, or may have different component configurations.

The memory 105 is coupled with the processor 101, and is configured to store various software programs such as operating system, network communications program, user interface program, profile migration program and/or multiple sets of instructions. In specific implementation, the memory 105 may include a high-speed random access memory (RAM), and may also include a non-volatile memory such as one or more disk storage devices, a flash device, or another non-volatile solid-state storage device.

The RF module 106 is configured to receive and send a radio frequency signal. The RF module 106 communicates with a communications network and another communications device using the radio frequency signal. In specific implementation, the RF module 106 may include but is not limited to an antenna system, an RF transceiver, one or more amplifiers, a tuner, one or more oscillators, a digital signal processor, a codec chip, a storage medium, and the like. In this embodiment of the present disclosure, the RF module 106 may include a SIM card 1061 and an eUICC 1062 such that the terminal 1000 is the compatible terminal.

The peripheral system 107 is mainly configured to implement an interaction function between the terminal 1000 and a user/an external environment. In specific implementation, the peripheral system 107 may include an LCD controller 108, a camera controller 109, an audio controller 110, a touchscreen controller 111, and a sensor management module 112. Each controller may be coupled with a respective peripheral device. In some embodiments, the peripheral system 107 may further include another input/output peripheral controller.

The clock module 102 integrated into the processing module 100 is mainly configured to generate a clock required for data transmission and timing control for the processor 101. The power management module 103 integrated into the processing module 100 is mainly configured to provide a stable and high-precision voltage for the processor 101, the RF module 106, and the peripheral system 107. The processor 101 integrated into the processing module 100 is mainly configured to invoke a profile migration program stored in the memory 105, and execute the steps of receive, using the touchscreen 116, the audio circuit 115, or the sensor 117, a first migration instruction entered by a user, where the first migration instruction is used to instruct to the terminal 1000 to migrate from the SIM card 1061 to the eUICC 1062, send, using the RF 106, a first request to a server in response to the first migration instruction, where the first request includes a user identity corresponding to the SIM card 1061 and an identity of the eUICC 1062 such that the server generates or selects a profile for the eUICC 1062 according to the user identity, download the profile from the server to the eUICC 1062 using the RF module 106, enable the profile, access a mobile network using the profile, and disconnect a session from the SIM card 1061.

In an implementation of this embodiment of the present disclosure, before the processor 101 disconnects the session between the terminal 1000 and the SIM card 1061, the processor 101 may further receive, using the RF module 106, a first IMSI change instruction sent by the server in order to overwrite an existing IMSI of the SIM card 1061 with an invalid IMSI.

In this embodiment of the present disclosure, the first request may further include first verification information. The first verification information may be from the server.

Further, before sending the first request to the server using the RF module 106, the processor 101 may further send a second request to the server using the RF module 106. The second request includes the user identity corresponding to the SIM card 1061 such that the server sends the first verification information to the terminal 1000 or the SIM card 1061 using the user identity corresponding to the SIM card 1061.

Further, after the processor 101 disconnects the session from the SIM card 1061, the processor 101 may further implement migration from the eUICC 1062 to the SIM card 1061 for the terminal 1000. Further, the processor 101 may execute the following steps of receive, using the touchscreen 116, the audio circuit 115, or the sensor 117, a second migration instruction entered by the user, where the second migration instruction is used to instruct to migrate from the eUICC 1062 to the SIM card 1061, send, using the RF module 106, a third request to the server in response to the second migration instruction, where the third request includes a user identity corresponding to the profile, an identifier of the profile, and the identity of the eUICC 1062, receive, using the RF module 106, a disabling instruction or a deletion instruction sent by the server, where the disabling instruction or the deletion instruction includes the identity of the eUICC 1062 and the identifier of the profile, and disable the profile in the eUICC 1062 in response to the disabling instruction, or delete the profile from the eUICC 1062 in response to the deletion instruction.

In an implementation of this embodiment of the present disclosure, before receiving, using the RF module 106, the disabling instruction or the deletion instruction sent by the server, the processor 101 may further receive, using the RF module 106, a second IMSI change instruction sent by the server in order to write a valid IMSI into the SIM card 1061.

In this embodiment of the present disclosure, the third request may further include second verification information. The second verification information may be from the server.

Further, before sending the third request to the server using the radio frequency module 106, the processor 101 may further send a fourth request using the radio frequency module 106. The fourth request includes the user identity corresponding to the profile such that the server sends the second verification information to the terminal or the eUICC 1062 using the user identity corresponding to the profile.

It can be understood that, for the execution steps of the processor 101, reference may be further made to content in the method embodiments corresponding to FIG. 2 to FIG. 5 respectively. Details are not further described herein.

Figure 11:
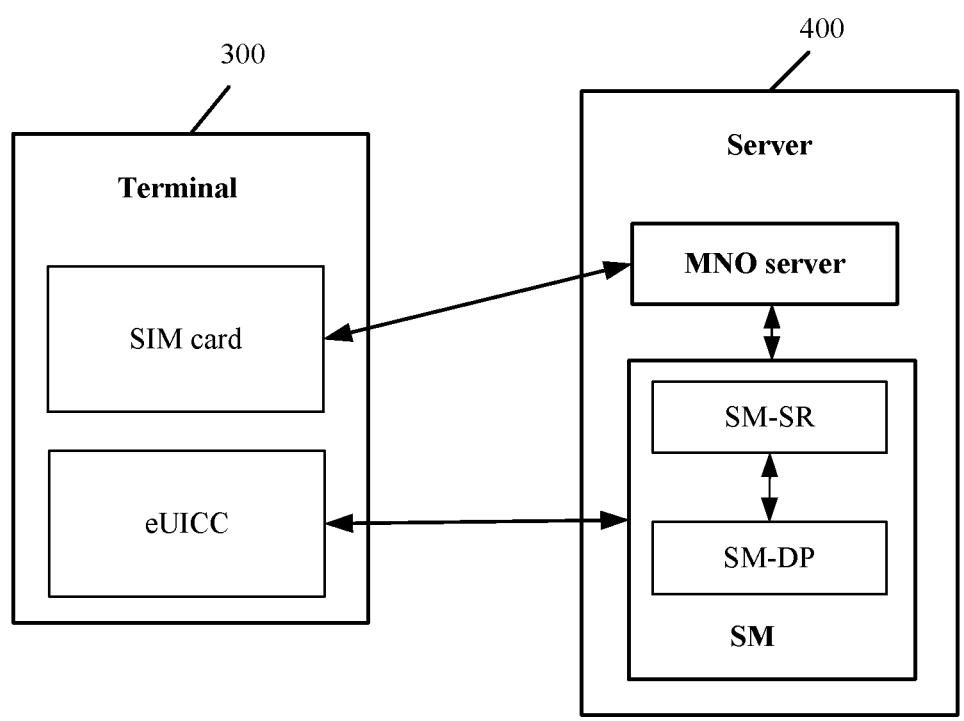
FIG. 11 is a schematic structural diagram of a communications system according to an embodiment of the present disclosure.

Referring to FIG. 11, FIG. 11 is a schematic diagram of a communications system according to an embodiment of the present disclosure. The system shown in FIG. 11 may include a terminal 300 and a server 400.

The terminal 300 may be the terminal described in the embodiment corresponding to FIG. 6, FIG. 7, or FIG. 10. Details are not further described herein.

The server 400 may be the server described in the embodiment corresponding to FIG. 8 or FIG. 9. Details are not further described herein.

In this embodiment of the present disclosure, the terminal 300 may be the terminal described in the method embodiments corresponding to FIG. 2 to FIG. 5 respectively. The terminal 300 may be compatible with both an eUICC and a SIM card, that is, the foregoing compatible terminal.

In this embodiment of the present disclosure, the server 400 may be the server described in the method embodiments corresponding to FIG. 2 to FIG. 5 respectively. In an embodiment, the server 400 may be multiple servers in a remote provisioning system of an eUICC, and further includes an MNO server, and a subscription manager (SM) including an SM-DP, and an SM-SR.

In conclusion, by means of implementing the embodiments of the present disclosure, a server is requested to generate a profile according to a user identity corresponding to a SIM card, and to download the profile to an eUICC, after the profile is enabled successfully, a mobile network is accessed using the profile, and a session with the SIM card is disconnected. This can implement migration from the SIM card to the eUICC. After the terminal implements migration from the SIM card to the eUICC, the server is requested to disable or delete the profile such that the end user can still use the SIM card to access the mobile network.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a RAM.

What is disclosed above is merely some embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A method for migration from a subscriber identity module (SIM) card to an embedded universal integrated circuit card (eUICC), comprising:
   receiving a first migration instruction from a user, wherein the first migration instruction instructs to migrate from the SIM card to the eUICC;
   sending a first request to a server in response to the first migration instruction, wherein the first request comprises a user identity corresponding to the SIM card and an identity of the eUICC;
   downloading a profile from the server to the eUICC;
   enabling the profile;
   accessing a mobile network using the profile; and
   disconnecting a session from the SIM card.

2. The method according to claim 1, wherein before disconnecting the session from the SIM card, the method further comprises receiving a first international mobile subscriber identity (IMSI) change instruction from the server to overwrite an existing IMSI of the SIM card with an invalid IMSI.

3. The method according to claim 1, wherein the first request further comprises first verification information.

4. The method according to claim 3, wherein before sending the first request to the server, the method further comprises sending a second request to the server, and wherein the second request comprises the user identity corresponding to the SIM card.

5. The method according to claim 1, wherein after disconnecting the session from the SIM card, the method further comprises:
   receiving a second migration instruction from the user, wherein the second migration instruction instructs to migrate from the eUICC to the SIM card;
   sending a third request to the server in response to the second migration instruction, wherein the third request comprises a user identity corresponding to the profile, an identifier of the profile, and the identity of the eUICC;
   receiving an instruction from the server, wherein the received instruction comprises a disabling instruction or a deletion instruction, and wherein the disabling instruction or the deletion instruction comprises the identity of the eUICC and the identifier of the profile;
   disabling the profile when the received instruction comprises the disabling instruction; and
   deleting the profile when the received instruction comprises the deletion instruction.

6. The method according to claim 5, wherein before receiving the instruction from the server, the method further comprises receiving a second international mobile subscriber identity (IMSI) change instruction from the server to write a valid IMSI into the SIM card.

7. The method according to claim 5, wherein the third request further comprises second verification information.

8. The method according to claim 7, wherein before sending third request to the server, the method further comprises sending a fourth request, and wherein the fourth request comprises the user identity corresponding to the profile.

9. A method for migration from a subscriber identity module (SIM) card to an embedded universal integrated circuit card (eUICC), comprising:
   receiving a first request from a terminal, wherein the first request comprises a user identity corresponding to the SIM card in the terminal and an identity of the eUICC in the terminal;
   generating or selecting a profile for the eUICC according to the user identity corresponding to the SIM card in response to the first request; and
   downloading the profile to the eUICC.

10. The method according to claim 9, wherein after generating or selecting the profile for the eUICC, and downloading the profile to the eUICC, the method further comprises:

writing a new root key into subscription data corresponding to the user identity corresponding to the SIM card;

disabling or deleting an old root key, wherein the old root key is the same as a root key in the SIM card; and sending a first international mobile subscriber identity (IMSI) change instruction to the terminal, wherein the first IMSI change instruction comprises an invalid IMSI to overwrite an existing IMSI of the SIM card.

11. The method according to claim 9, wherein the first request further comprises first verification information.

12. The method according to claim 11, wherein before receiving the first request from the terminal, the method further comprises:

receiving a second request from the terminal, wherein the second request comprises the user identity corresponding to the SIM card; and sending the first verification information to the terminal in response to the second request.

13. The method according to claim 9, wherein after generating or selecting the profile for the eUICC, and downloading the profile to the eUICC, the method further comprises:

receiving a third request from the terminal, wherein the third request comprises a user identity corresponding to the profile, an identifier of the profile, and the identity of the eUICC; and sending a disabling instruction to the terminal in response to the third request to disable the profile, wherein the disabling instruction comprises the identity of the eUICC and the identifier of the profile.

14. The method according to claim 13, wherein before sending the disabling instruction to the terminal, the method further comprises sending a second international mobile subscriber identity (IMSI) change instruction to the terminal, wherein the second IMSI change instruction comprises a valid IMSI, wherein after sending the disabling instruction to the terminal, the method further comprises enabling an old root key in subscription data corresponding to the user identity corresponding to the SIM card, and wherein the old root key is the same as a root key in the SIM card.

15. A communications system, comprising:

a terminal configured to:

receive a first migration instruction from a user, wherein the first migration instruction instructs to migrate from a subscriber identity module (SIM) card to an embedded universal integrated circuit card (eUICC);

send a first request to a server in response to the first migration instruction, wherein the first request comprises a user identity corresponding to the SIM card and an identity of the eUICC;

download a profile from the server to the eUICC;

enable the profile;

access a mobile network using the profile;

disconnect a session from the SIM card, and wherein the server is coupled to the terminal and configured to:

receive the first request from the terminal, wherein the first request comprises the user identity corresponding to the SIM card in the terminal and the identity of the eUICC in the terminal;

generate or select the profile for the eUICC according to the user identity corresponding to the SIM card in response to the first request; and download the profile to the eUICC.

16. The method according to claim 9, wherein after generating or selecting the profile for the eUICC, and downloading the profile to the eUICC, the method further comprises sending a first international mobile subscriber identity (IMSI) change instruction to the terminal, and wherein the first IMSI change instruction comprises an invalid IMSI to overwrite an existing IMSI of the SIM card.

17. The method according to claim 9, wherein after generating or selecting the profile for the eUICC, and downloading the profile to the eUICC, the method further comprises:

writing a new root key into subscription data corresponding to the user identity corresponding to the SIM card; and disabling or deleting an old root key, wherein the old root key is the same as a root key in the SIM card.

18. The method according to claim 11, wherein before receiving the first request from the terminal, the method further comprises:

receiving a second request from the terminal, wherein the second request comprises the user identity corresponding to the SIM card; and sending the first verification information to the SIM card in response to the second request.

19. The method according to claim 9, wherein after generating or selecting the profile for the eUICC, and downloading the profile to the eUICC, the method further comprises:

receiving a third request from the terminal, wherein the third request comprises a user identity corresponding to the profile, an identifier of the profile, and the identity of the eUICC; and sending a deletion instruction to the terminal in response to the third request to delete the profile, wherein the deletion instruction comprises the identity of the eUICC and the identifier of the profile.

20. The method according to claim 19, wherein before sending the deletion instruction to the terminal, the method further comprises sending a second international mobile subscriber identity (IMSI) change instruction to the terminal, wherein the second IMSI change instruction comprises a valid IMSI, wherein after sending the deletion instruction to the terminal, the method further comprises enabling an old root key in subscription data corresponding to the user identity corresponding to the SIM card, and wherein the old root key is the same as a root key in the SIM card.

* * * * *